(12) United States Patent
Tsaur et al.

(10) Patent No.: US 9,880,776 B1
(45) Date of Patent: Jan. 30, 2018

(54) CONTENT-DRIVEN DATA PROTECTION METHOD FOR MULTIPLE STORAGE DEVICES

(71) Applicant: Veritas Technologies LLC, Mountain View, CA (US)

(72) Inventors: Ynn-Pyng Tsaur, Oviedo, FL (US); Ping Wang, Sanford, FL (US)

(73) Assignee: Veritas Technologies LLC, Mountain View, CA (US)

( * ) Notice: Subject to any disclaimer, the term of this patent is extended or adjusted under 35 U.S.C. 154(b) by 304 days.

(21) Appl. No.: 13/774,072

(22) Filed: Feb. 22, 2013

(51) Int. Cl.
*G06F 3/06* (2006.01)
*G06F 11/14* (2006.01)

(52) U.S. Cl.
CPC ............. *G06F 3/065* (2013.01); *G06F 3/067* (2013.01); *G06F 3/0608* (2013.01); *G06F 11/1458* (2013.01)

(58) Field of Classification Search
None
See application file for complete search history.

(56) References Cited

U.S. PATENT DOCUMENTS

| | | | |
|---|---|---|---|
| 5,276,860 A | 1/1994 | Fortier et al. | |
| 5,487,167 A | 1/1996 | Dinallo et al. | |
| 5,535,381 A | 7/1996 | Kopper | |
| 5,555,371 A | 9/1996 | Duyanovich et al. | |
| 5,559,991 A | 9/1996 | Kanfi | |
| 5,581,764 A | 12/1996 | Fitzgerald et al. | |
| 5,708,796 A | 1/1998 | Ozden et al. | |
| 5,712,976 A | 1/1998 | Falcon, Jr. et al. | |

(Continued)

FOREIGN PATENT DOCUMENTS

| | | |
|---|---|---|
| EP | 0838758 A2 | 4/1998 |
| JP | S6436332 A | 2/1989 |

(Continued)

OTHER PUBLICATIONS

Yang, et al, "A Feather-weight Virtual Machine for Windows Applications", Proceedings of the 2nd International Conference on Virtual Execution Environments, Jun. 14, 2006, pp. 24-34, ACM, New York, NY, US.

(Continued)

*Primary Examiner* — Reginald Bragdon
*Assistant Examiner* — Edward Wang
(74) *Attorney, Agent, or Firm* — Rory D. Rankin; Meyertons, Hood, Kivlin, Kowert & Goetzel, P.C.

(57) ABSTRACT

A backup storage system and methods implemented by the backup storage system are disclosed. The backup software performs a plurality of backup operations to backup one or more data objects according to a backup schedule. The backup operations may be alternated across a plurality of backup storage devices, and each of the backup operations may operate to store a respective backup data set on one of the backup storage devices. In performing the plurality of backup operations, the backup storage system may create the backup data sets such that each respective backup storage device can be used independently of the other backup storage device(s) to perform a complete recovery of the one or more data objects to any point in time that corresponds to any respective backup data set stored on the respective backup storage device.

18 Claims, 5 Drawing Sheets

(56) References Cited

U.S. PATENT DOCUMENTS

| | | | |
|---|---|---|---|
| 5,742,768 | A | 4/1998 | Gennaro et al. |
| 5,745,380 | A | 4/1998 | Sandvoss et al. |
| 5,754,774 | A | 5/1998 | Bittinger et al. |
| 5,761,477 | A | 6/1998 | Wahbe et al. |
| 5,764,235 | A | 6/1998 | Hunt et al. |
| 5,765,164 | A | 6/1998 | Prasad et al. |
| 5,787,284 | A | 7/1998 | Blainey et al. |
| 5,802,292 | A | 9/1998 | Mogul |
| 5,835,749 | A | 11/1998 | Cobb |
| 5,835,953 | A | 11/1998 | Ohran |
| 5,878,223 | A | 3/1999 | Becker et al. |
| 5,919,247 | A | 7/1999 | Van Hoff et al. |
| 5,933,644 | A | 8/1999 | Wallace |
| 5,974,129 | A | 10/1999 | Bodnar |
| 5,978,788 | A | 11/1999 | Castelli et al. |
| 5,978,791 | A | 11/1999 | Farber et al. |
| 5,991,542 | A | 11/1999 | Han et al. |
| 6,003,087 | A | 12/1999 | Housel, III et al. |
| 6,009,410 | A | 12/1999 | LeMole et al. |
| 6,029,168 | A | 2/2000 | Frey |
| 6,073,129 | A | 6/2000 | Levine et al. |
| 6,085,298 | A | 7/2000 | Ohran |
| 6,088,524 | A | 7/2000 | Levy et al. |
| 6,101,585 | A | 8/2000 | Brown et al. |
| 6,122,628 | A | 9/2000 | Castelli et al. |
| 6,304,882 | B1 | 10/2001 | Strellis et al. |
| 6,311,221 | B1 | 10/2001 | Raz et al. |
| 6,360,330 | B1 | 3/2002 | Mutalik et al. |
| 6,366,987 | B1 | 4/2002 | Tzelnic et al. |
| 6,542,962 | B2 | 4/2003 | Kodama et al. |
| 6,543,004 | B1* | 4/2003 | Cagle et al. .............. 714/15 |
| 6,640,278 | B1 | 10/2003 | Nolan et al. |
| 6,665,815 | B1 | 12/2003 | Goldstein et al. |
| 6,714,952 | B2 | 3/2004 | Dunham et al. |
| 6,738,908 | B1 | 5/2004 | Bonn et al. |
| 6,829,688 | B2 | 12/2004 | Grubbs et al. |
| 6,847,983 | B2 | 1/2005 | Somalwar et al. |
| 6,865,655 | B1 | 3/2005 | Andersen |
| 6,880,051 | B2 | 4/2005 | Timpanaro-Perrotta |
| 6,910,112 | B2 | 6/2005 | Berkowitz et al. |
| 6,938,135 | B1 | 8/2005 | Kekre et al. |
| 6,976,039 | B2 | 12/2005 | Chefalas et al. |
| 7,149,858 | B1 | 12/2006 | Kiselev |
| 7,290,017 | B1 | 10/2007 | Wang et al. |
| 7,290,101 | B1 | 10/2007 | Kekre et al. |
| 7,325,161 | B1 | 1/2008 | Rakic et al. |
| 7,353,352 | B2 | 4/2008 | Nishimura et al. |
| 7,360,110 | B1 | 4/2008 | Schmokel et al. |
| 7,360,123 | B1 | 4/2008 | Westenberg et al. |
| 7,386,752 | B1 | 6/2008 | Rakic et al. |
| 7,389,314 | B2 | 6/2008 | Kulkarni et al. |
| 7,549,032 | B1 | 6/2009 | Kekre et al. |
| 7,596,713 | B2 | 9/2009 | Mani-Meitav et al. |
| 7,617,414 | B2 | 11/2009 | Becker et al. |
| 7,620,630 | B2 | 11/2009 | Lloyd et al. |
| 7,735,057 | B2 | 6/2010 | Rachman et al. |
| 7,991,973 | B2 | 8/2011 | Jacobson et al. |
| 8,001,117 | B2 | 8/2011 | Yahia et al. |
| 8,060,474 | B2 | 11/2011 | Beatty et al. |
| 8,065,278 | B2 | 11/2011 | Beatty et al. |
| 8,131,680 | B2 | 3/2012 | Prahlad et al. |
| 8,190,564 | B2 | 5/2012 | Pang |
| 8,255,364 | B2 | 8/2012 | Burnett et al. |
| 8,261,122 | B1 | 9/2012 | Kappel et al. |
| 8,364,640 | B1 | 1/2013 | Beatty et al. |
| 8,386,438 | B2 | 2/2013 | Beatty et al. |
| 8,726,147 | B1 | 5/2014 | Beatty et al. |
| 8,818,961 | B1 | 8/2014 | Beatty et al. |
| 8,925,034 | B1 | 12/2014 | Tsaur et al. |
| 2002/0143743 | A1 | 10/2002 | Iyer et al. |
| 2003/0154404 | A1 | 8/2003 | Beadles et al. |
| 2003/0163495 | A1 | 8/2003 | Lanzatella et al. |
| 2003/0177149 | A1 | 9/2003 | Coombs |
| 2004/0230971 | A1 | 11/2004 | Rachman et al. |
| 2004/0268068 | A1 | 12/2004 | Curran |
| 2005/0102297 | A1 | 5/2005 | Lloyd et al. |
| 2006/0230116 | A1 | 10/2006 | Couper et al. |
| 2006/0259509 | A1 | 11/2006 | Stolte et al. |
| 2007/0143307 | A1 | 6/2007 | Bowers et al. |
| 2007/0283017 | A1 | 12/2007 | Anand et al. |
| 2008/0010630 | A1 | 1/2008 | Ou-Yang et al. |
| 2008/0162491 | A1 | 7/2008 | Becker et al. |
| 2008/0276217 | A1 | 11/2008 | Nagaoka |
| 2010/0082553 | A1 | 4/2010 | Beatty et al. |
| 2010/0274767 | A1* | 10/2010 | Irisawa ............... G06F 11/1456 707/654 |
| 2011/0131178 | A1 | 6/2011 | Kanellos |
| 2011/0196840 | A1* | 8/2011 | Barzilai et al. .............. 707/645 |

FOREIGN PATENT DOCUMENTS

| | | |
|---|---|---|
| JP | H04336354 A | 11/1992 |
| JP | H07271603 A | 10/1995 |
| JP | H086878 A | 1/1996 |
| JP | H0851596 A | 2/1996 |
| JP | H1091446 A | 4/1998 |
| JP | H10133976 A | 5/1998 |
| JP | H10162057 A | 6/1998 |
| WO | 97/00475 | 1/1997 |
| WO | 97/46955 | 12/1997 |

OTHER PUBLICATIONS

Glass, Graham, "A Universal Streaming Service", C++ Report, Apr. 1996, pp. 74-76 and 81-83.

Ritchey, Tim, "Java!", Dec. 1995, pp. 214-216, New Riders Publishing, Indianapolis, IN, US.

Chen, et al., "Real-Time Video and Audio in the World Wide Web" World Wide Web Journal, Fourth International World Wide Web Conference: The Web Revolution, Dec. 11-14, 1995, pp. 333-348.

Jiang, Z. and Kleinrock, L. (1997) "Prefetching links on the WWW" IEEE International Conference on Communications (ICC), US, New York, NY: IEEE, pp. 483-489.

Schwartz, Mischa, "Telecommunication Networks: Protocols, Modeling and Analysis", Jan. 1, 1987; Addison-Wesley Publishing Company, pp. 266-283.

Basu, et al., "Degrees of Transaction Isolation in SQL *Cache: A Predicate-based Client-side Caching System", May 15, 1996, pp. 1-22.

Shukla, et al., "Storage Estimation for Multidimensional Aggregates in the Presence of Hierarchies", VLDB Conference Mumbai (Bombay), 1996, pp. 522-531.

Skeen, Dale, "New Forms of Persistent Queries Are Necessary to Handle Live Business Data as It Speeds Through A Company", internet website www.byte.com BYTE Magazine, Feb. 1998, 5pgs.

Van Hoff, et al. "The Open Software Description Format (OSD)", internet website www.w3.org, Aug. 11, 1997, pp. 1-13.

Red Brick Vista, "Aggregate Computation and Management", internet website www. informix.com, printed Oct. 4, 2000.

"Web Site Performance is Key to E-Commerce Sucess", Fireclick, internet website www.Fireclick.com printed, Nov. 1, 2000.

Boost Web Optimizer Technology Overview, "How it Works", Sep. 27, 2000 and internet website www.boostworks.com printed Nov. 1, 2000.

"Delivering Windows to the Net White Paper", WinToNet by Menta Software, 2000 and Website http://216.205.21.102/ printed Nov. 1, 2000.

"First There was Streaming Audio, then Streaming Video. Now get ready for Streaming Software", Stream Theory White paper and Website www.Streamtheory.com printed Sep. 22, 2000.

"OSD Describing Software Package on the Internet", Marimba Inc. White paper 1998 and website www.marimba.com, printed Nov. 1, 2000.

"Timbale for Windows Terminal Services" Marimba Promotional document, undated, 2000.

Westenberg et al., U.S. Appl. No. 10/881,897, entitled "Configuring a protection solution by subtracting from a comprehensive solution", filed Jun. 30, 2004.

(56) References Cited

OTHER PUBLICATIONS

"OASIS DCML Framework TC", OASIS—Advancing open standards for the information society, 2014, https://www.oasis-open.org/committees/tc_home.php?wg_abbrev=dcml-frame#feedback, 2 pages. [Retrieved Aug. 4, 2014].

"Windows DDK Glossary," http://msdn.microsoft.com/library/default.asp?url=/library/en-us/gloss/hh/gloss/glossary_628b1dfc-c8f0-4143-a4ef-0dddae24be4b.xml.asp, (3 pages).

"RepliWeb® R-1 User Guide—Version 3.1," RepliWeb, Inc., 2002, (26 pages).

"FilesX Xchange Restore™ for Microsoft Exchange Server," FilesX, Inc., Aug. 2003, (2 pages).

"Instructor Articles," VERITAS Education, pp. 1-7, Apr. 2003.

"EMC TimeFinder Family," EMC Corporation, 8 pages, Oct. 2004.

"EMC TimeFinder Local Replication," EMC Corporation, 2 pages, Oct. 2004.

"Storage Area Networking: High-Speed Data Sharing Among Multiple Computer Platforms", Tivoli Systems, Inc., Copyright 2000. ftp://ftp.software.ibm.com/software/tivoli/whitepapers/san_datasharing_wp.pdf, (2000), 4 pages.

"Storage Management: Best Practices", Copyright 2001, IBM Corp., ftp://ftp.software.ibm.com/software/tivoli/whitepapers/wp-storage-bp.pdf, (2001), 11 pages.

Amiri, Khalil S., "Scalable and manageable storage systems", Ph.D. Thesis, Dept. of Electrical and Computer Engineering, Carnegie Mellon University, Pittsburgh, PA, http://www.pdl.cmu.edu/PDL-FTP/NASD/amiri_thesis.pdf, (Dec. 2000), i-241 pgs.

Wylie, et al., "Selecting the Right Data Distribution Scheme for a Survivable Storage System", Research Paper, School of Computer Science, Carnegie Mellon University, Pittsburgh, PA, http://www.pdl.cmu.edu/PDL-FTP/Storage/CMU-CS-01-120.pdf, May 2001), pp. 1-21.

Tsaur, Anker, "Data Lifecycle Management in BE 2012", Mar. 6, 2012, 2 pages, Symantec Corporation, http://www.symantec.com/connect/blogs/data-lifecycle-management-be-2012. [Retrieved Jan. 6, 2015].

* cited by examiner

FIG. 4

| Monday (Run incremental backup at 11pm) | Tuesday (Run incremental backup at 11pm) | Wednesday (Run incremental backup at 11pm) | Thursday (Run incremental backup at 11pm) | Friday (Run full backup at 11pm) |
|---|---|---|---|---|
| | | | | Day 1 — On the first backup storage device, create a full backup data set |
| Day 2 — On the second backup storage device, create a full backup data set | Day 3 — On the first backup storage device, create an incremental backup data set which includes the data that changed between Day 1 and Day 3 | Day 4 — On the second backup storage device, create an incremental backup data set which includes the data that changed between Day 2 and Day 4 | Day 5 — On the first backup storage device, create an incremental backup data set which includes the data that changed between Day 3 and Day 5 | Day 6 — On the second backup storage device, create a full backup data set |
| Day 7 — On the first backup storage device, create an incremental backup data set which includes the data that changed between Day 5 and Day 7 | Day 8 — On the second backup storage device, create an incremental backup data set which includes the data that changed between Day 6 and Day 8 | Day 9 — On the first backup storage device, create an incremental backup data set which includes the data that changed between Day 7 and Day 9 | Day 10 — On the second backup storage device, create an incremental backup data set which includes the data that changed between Day 8 and Day 10 | Day 11 — On the first backup storage device, create a full backup data set |
| Day 12 — On the second backup storage device, create an incremental backup data set which includes the data that changed between Day 10 and Day 12 | Day 13 — On the first backup storage device, create an incremental backup data set which includes the data that changed between Day 11 and Day 13 | Day 14 — On the second backup storage device, create an incremental backup data set which includes the data that changed between Day 12 and Day 14 | Day 15 — On the first backup storage device, create an incremental backup data set which includes the data that changed between Day 13 and Day 15 | Day 16 — On the second backup storage device, create a full backup data set |

CONTENT-DRIVEN DATA PROTECTION METHOD FOR MULTIPLE STORAGE DEVICES

BACKGROUND OF THE INVENTION

Field of the Invention

This invention relates to the field of computer systems, and more particularly, to a backup storage system configured to implement a content-driven data protection method for storing backup data across a plurality of backup storage devices such that a complete recovery chain of backup data is maintained on each of the backup storage devices.

Description of the Related Art

Computer data is a very important part of business operations, as well as being important for individual people. Data is stored on disk drives or other storage devices that are subject to failure, which may result in the loss of the data. Since the loss of important data can cause major problems, it is very important to keep a backup copy of the data on a separate backup storage device. To this end, many computer systems use backup software to backup the data from the primary storage device to the backup storage device. For example, the backup software may execute at different points in time to create different backup images. If the primary storage device ever fails or needs to be taken back to a previous point in time, the backup software may perform a recovery operation to select the appropriate backup image from the backup storage device and restore the data from it to the primary storage device (or to a replacement primary storage device).

Just as the primary storage device can fail, the backup storage device can also fail. If the backup storage device fails, then the data may still be present on the primary storage device, but the backup images representing the data at the previous points in time may be lost. This may be problematic if any files or other data objects need to be recovered to their state as they existed as previous points in time. It may thus be desirable to provide a backup storage system that addresses this problem.

SUMMARY

Various embodiments of a backup storage system and methods implemented by the backup storage system are disclosed. In some embodiments the backup storage system may be configured to store information specifying a backup schedule for backing one or more data objects. The backup storage system may perform a plurality of backup operations to backup the one or more data objects according to the backup schedule. Each of the backup operations may be performed at a respective time specified by the backup schedule. The backup operations may be alternated across a plurality of backup storage devices, and each of the backup operations may operate to store, on a respective backup storage device of the plurality of backup storage devices, a respective backup data set corresponding to the respective time at which the respective backup operation is performed.

In performing the plurality of backup operations, the backup storage system may create the backup data sets such that each respective backup storage device can be used independently of the other backup storage device(s) to perform a complete recovery of the one or more data objects to any point in time that corresponds to any respective backup data set stored on the respective backup storage device.

In some embodiments the plurality of backup operations may include a particular incremental backup operation performed at a particular time. In performing the particular incremental backup operation, the backup storage system may determine that a particular backup storage device of the plurality of backup storage devices should be used for the particular incremental backup operation. The backup storage system may also determine a most recent backup data set stored on the particular backup storage device, e.g., where the most recent backup data set corresponds to a previous time prior to the particular time. The backup storage system may determine a new backup data set including data from the data objects that has changed between the previous time and the particular time, and may backup the new backup data set to the particular backup storage device.

In some embodiments, only one of the plurality of backup storage devices may be coupled to the backup storage system at the particular time when the particular incremental backup operation is performed. For example, in some embodiments a user or administrator of the backup storage system may manually swap out the backup storage devices between the backup operations so that only one of them is coupled to the backup storage system when any given backup operation is performed. In such an embodiment, determining that the particular backup storage device should be used for the particular incremental backup operation may be accomplished by determining that the particular backup storage device is coupled to the computer system at the particular time.

In some embodiments, the backup schedule may specify that an incremental backup operation should be performed at a particular time. The backup storage system may be configured to: at the particular time, determine that a particular backup storage device of the plurality of backup storage devices should be used for a new backup operation, and perform the new backup operation at the particular time as a full backup operation instead of the specified incremental backup operation in response to determining that a full backup operation has not yet been performed on the particular backup storage device.

In some embodiments, each of the backup storage devices may be a removable backup storage device. In some embodiments, each of the backup storage devices may be one of a Universal Serial Bus (USB) storage device, or an IEEE 1394 storage device.

In some embodiments the backup operations may be alternated across the plurality of backup storage devices in a round-robin fashion. In other embodiments any of various other kinds of alternation algorithms or schedules can be used.

BRIEF DESCRIPTION OF THE DRAWINGS

A better understanding of the invention can be obtained when the following detailed description is considered in conjunction with the following drawings, in which:

FIG. 4 illustrates an example of a backup schedule and backup data sets created by the backup storage system.

Figure 1:
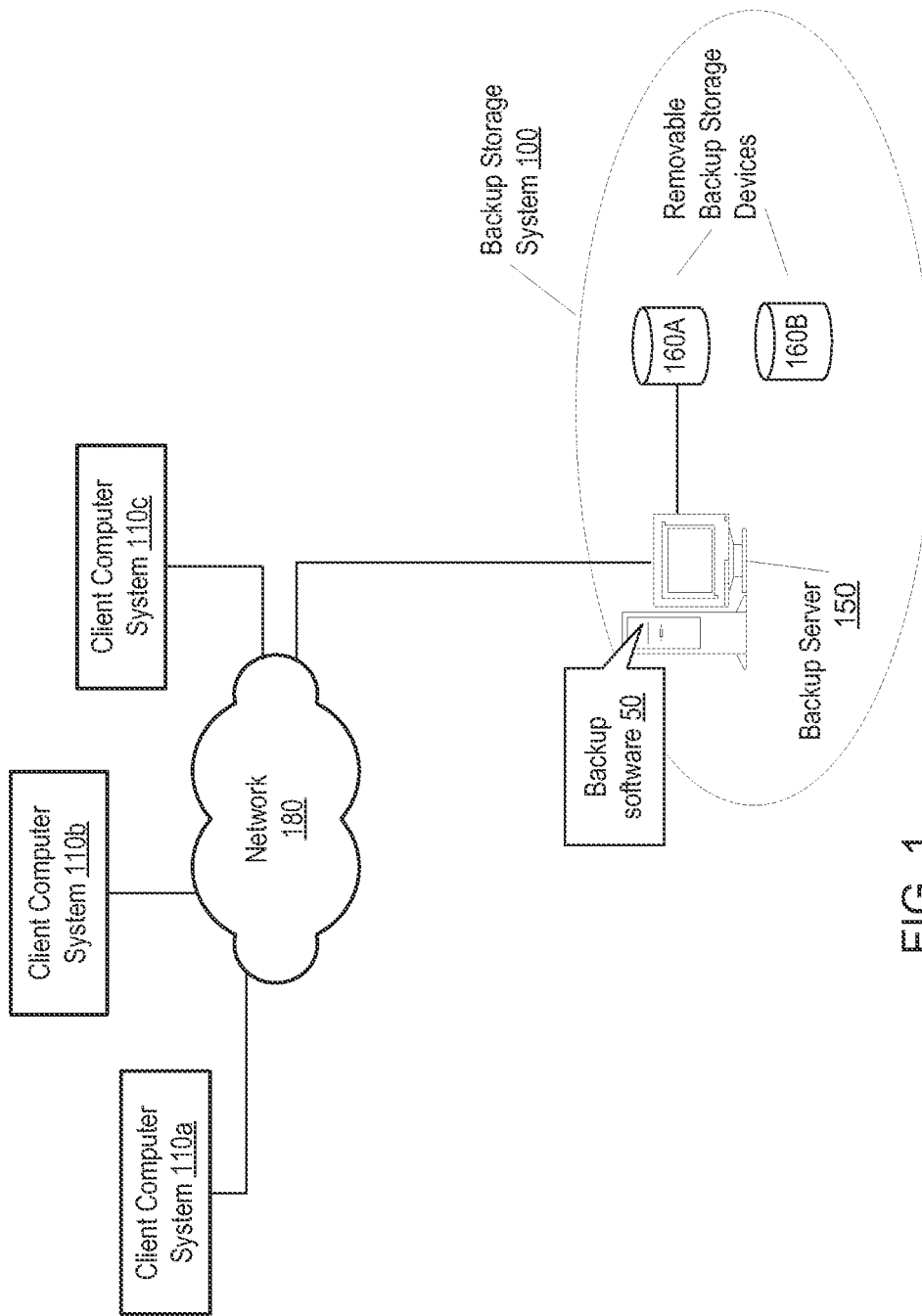
FIG. 1 illustrates one embodiment of a backup storage system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Various embodiments of a backup storage system and content-driven data protection method implemented by the backup storage system are disclosed. The backup storage system may be configured to perform a plurality of backup operations to backup one or more data objects according to a backup schedule. The backup storage system may include a plurality of backup storage devices and may be configured to alternate the backup operations across the backup storage devices. For example, in some embodiments the backup operations may be alternated across the backup storage devices in a round-robin fashion. For example, if there are two backup storage devices then a first backup operation may create a first backup data set on the first backup storage device, and the next backup operation may create a second backup data set on the second backup storage device. This cycle may then repeat, e.g., such that the next backup operation creates a third backup data set on the first backup storage device, and then the next backup operation creates a fourth backup data set on the second backup storage device, and so on.

Furthermore, the backup data sets may be created in such a way that each respective backup storage device can be used independently of the other backup storage device(s) to perform a complete recovery of the one or more data objects to any point in time that corresponds to any respective backup data set stored on the respective backup storage device. Each of the backup data sets on any given backup storage device may be independent from (e.g., do not depend on) the backup data sets on the other backup storage device(s). Thus, if one of the backup storage devices fails, then any of the backup data sets on the other backup storage device(s) can still be used to perform a complete recovery of the data objects.

The backup operations that are performed by the backup storage system may include both full backup operations and incremental backup operations. A full backup operation is a backup operation that creates a backup data set which includes a complete copy of the data being backed up. An incremental backup operation is a backup operation that creates a backup data set which does not include a complete copy of the data being backed up, but instead includes only a subset of the data which has changed since a previous point in time. Since a full backup data set which is created by a full backup operation includes a complete copy of the data being backed up, the full backup data set may be completely independent of any other backup data set (e.g., may be used to recover or restore the complete copy of the data without using any other backup data set). On the other hand, the incremental backup data set created by an incremental backup operation is based on, and depends on, a previously created backup data set corresponding to the previous point in time. The previously created backup data set may be either a full backup data set or another incremental backup data set. (As used herein, the term "incremental backup operation" also includes what is sometimes called a differential backup operation. A differential backup operation is a special case of an incremental backup operation where the backup data set created by the operation depends directly on a full backup data set, and does not depend on another incremental backup data set.)

The backup storage system may enable a user or administrator of the system to specify a backup schedule for the backup operations and may store the backup schedule information. The backup schedule may specify when each backup operation should be performed, as well as the type of backup operation (e.g., full or incremental) to perform at each scheduled time. As an example, the backup schedule could specify that a new full backup operation should be performed at the end of each business week on Friday night at 11:00 pm, and incremental backup operations should be performed on each other weeknight (Monday-Thursday) at 11:00 pm.

When an incremental backup operation is scheduled to be performed on a given backup storage device, the backup software executed by the backup storage system may first check whether a full backup data set (i.e., a backup data set created by a full backup operation) is stored on the backup storage device. If not, then the backup software may perform a full backup operation instead of an incremental backup operation. This is to ensure that a complete recovery chain of data is stored on the backup storage device. (If the backup software were to store an incremental backup data set on the backup storage device without a full backup data set being present then there would be no way to recover a complete copy of the data using this backup storage device independently from the other backup storage device(s).)

Otherwise, if a full backup data set is already stored on the backup storage device then the backup software may perform the scheduled incremental backup operation, which may operate to store a new incremental backup data set on the backup storage device. The incremental backup data set may be based on the most recent backup data set that is already stored on this backup storage device, e.g., such that the incremental backup data set includes the subset of data that has changed between the time when the most recent backup data set on this storage device was created and the current time. (The most recent backup data set may be either a full backup data set or an incremental backup data set.) Thus, each time the backup software performs a new backup operation to create a new backup data set for a given backup storage device, the backup software may determine how to create the new backup data set based on the content (e.g., the backup sets), if any, that is already stored on that backup storage device so as to maintain a complete recovery chain of data on each of the backup storage devices used in the system.

Maintaining a complete recovery chain of data on each of the backup storage devices may enable each respective backup storage device to be used independently of the other backup storage device(s) to perform a complete recovery of the data objects to any point in time that corresponds to any respective backup data set stored on the respective backup storage device. The ability to perform a complete recovery of a given data object to a prior point in time corresponding to a respective backup data set means that a complete version of the data object can be restored to a target storage device such that the version restored to the target storage device is complete (e.g., not missing any data of the data object) and such that the restored version has the same data as the data object previously had at the prior point in time.

It is noted that the backup software in some conventional backup storage systems may not enable backup operations to be alternated across multiple storage devices such that a complete recovery chain of data is maintained on each one. First of all, some conventional backup storage systems may not allow backup operations to be alternated across different backup storage devices. Secondly, if the user attempts to manually swap out the target backup storage devices between backup operations, problems may result. For example, in many backup storage systems, new incremental backup data sets are always based on the most recent backup data set created by the system. If only one backup storage device is used to store all the backup data sets then there may be a complete recovery chain of data on the backup storage device, but then there is the potential problem that this single backup storage device could break and cause all of the backup data to be lost. On the other hand, if the backup operations are alternated across multiple backup storage devices then none of the backup devices may have a complete recovery chain of data that is independent of the other backup storage devices. For example, suppose that the backup operations are alternated across two backup storage devices in a round-robin fashion in a conventional backup storage system. Assume that both of the backup storage devices are initially empty. The conventional backup storage system may first perform a full backup operation to create a full backup data set on the first backup storage device. The next scheduled backup operation may be an incremental backup operation, and the target backup storage device for this incremental backup operation may be the second backup storage device. However, the conventional backup software may not be configured to check to see whether a full backup data set is already stored on the second backup storage device (which it is not), and may go ahead and perform the backup operation as an incremental backup operation which stores an incremental backup data set on the second backup storage device which depends on the full backup data set stored on the first backup storage device. Thus, the incremental backup data set is stored on the second backup storage device without a full backup data set being stored on the second backup storage device along with it, which means that there is no complete recovery chain of backup data on the second backup storage device. Thus, if the first backup storage device breaks then there would be no way to perform a complete recovery of the data object(s) to the point in time corresponding to the incremental backup data set stored on the second backup storage device, since the incremental backup data set only includes the subset of data that changed between two points in time and is thus missing some of the data of the data object(s).

As a further problem, suppose that the next scheduled backup operation after the first incremental backup operation is another incremental backup operation whose target is the first backup storage device. Since the conventional backup software always bases new incremental backup data sets on the most recent backup data set created by the system, the new incremental backup data created for the first backup storage device may be based on the first incremental backup data set stored on the second backup storage device. This means that the first backup storage device will also not have a complete recovery chain of backup data that is independent of the second backup storage device because the new incremental backup data set stored on the first backup storage device depends on the first incremental backup data set stored on the second backup storage device.

Various embodiments of the present backup storage system described herein may overcome these problems posed by conventional backup systems.

Referring now to FIG. 1, one embodiment of a backup storage system 100 is illustrated. The backup storage system 100 may include one or more backup server computers 150 configured to execute backup software 50. The backup server computer(s) 150 may be coupled via a network 180 to one or more data sources that store data objects to be backed up to the backup storage system 100, such as client computer systems 110a-c. The backup software 50 executing on the backup server computer(s) 150 may backup the data objects (or portions thereof) from the client computer systems 110a-c onto a plurality of backup storage devices 160, e.g., where successive backup operations alternate across the plurality of backup storage devices 160 in a round-robin fashion or other fashion.

In the illustrated example there are two backup storage devices 160, but in other embodiments there may be more than two backup storage devices 160. In some embodiments it may be desirable for the backup storage devices 160 to be removable storage devices. A removable storage device is a storage device that can be physically connected and disconnected from a computer system easily and quickly, e.g., may be designed for easy connection and disconnection. A removable storage device may be housed in a housing or chassis situated externally from a housing or chassis of the computer system, e.g., as opposed to being located within the housing of the computer system. In some embodiments a removable storage device may be designed to be portable, e.g., so that it can be easily carried by a person. One example of a removable storage device is an external Universal Serial Bus (USB) disk drive (or other type of USB storage device) designed to be connected to a USB port of a computer system, e.g., via a cable. In other embodiments, a removable storage device may be any of various other kinds of external devices that connect via a cable (or other physical connection means) to a communication port or bus port located on the external housing of a computer system, such as an external IEEE 1394 disk drive for example.

In various embodiments the backup storage device(s) 160 used in the backup storage system 100 may be or may include any type of device or combination of devices configured to store data. Examples of storage devices include disk-based devices (e.g., devices with one or more hard disk drives), tape devices, optical devices, solid state drives, flash memory devices, etc. In some embodiments it may be desirable to use inexpensive and commonly available (e.g., "off the shelf") storage devices as the backup storage devices 160, e.g., as opposed to using expensive, complex, and/or proprietary backup storage hardware. Again, a USB disk drive is an example of an inexpensive and widely available storage device that could be used as a backup storage device.

In some embodiments only one of the backup storage devices 160 may be connected to the backup server computer 150 at any given time. For example, suppose that the backup schedule specifies that a new backup operation should be performed at the end of each weekday. Some time before the end of each weekday, the administrator may disconnect the backup storage device 160 that is currently connected to the backup server computer and connect another one in its place. Swapping out the backup storage devices in this manner may cause the backup operations to be alternated across the backup storage devices. In other embodiments, all of the backup storage devices 160 may stay connected to the backup server computer system, and the backup software 50 may automatically select different ones to use as the targets for the backup operations in an alternating manner. It is noted that using portable storage devices as the backup storage devices and physically swapping them out may enable greater protection against disasters in some embodiments because the administrator may be able to keep different backup storage devices in different locations to guard against complete data loss in the event of a fire, earthquake, or other disaster scenario.

In various embodiments the data objects that are backed up by the backup storage system 100 may be any kind of data objects. As used herein, the term data object may refer to any logical entity or data structure that encapsulates or represents a particular set of data. For example, in some embodiments each data object may be a file. As another example, a data object can be a database or object stored in a database, a software component, a virtual machine, or virtually any other kind of object, component, or data structure.

The data objects may be backed up from any number and any type of client computer systems or other data sources. The client computer systems or other data sources may be coupled to the backup server computer system 150 through any kind of network 180 and/or through any kind of intermediate device(s). The network 180 may include any type of network or combination of networks. For example, the network may include any type or combination of local area network (LAN), a wide area network (WAN), wireless networks, an Intranet, the Internet, storage area network (SAN), etc. Examples of local area networks include Ethernet networks, Fiber Distributed Data Interface (FDDI) networks, and token ring networks. Also, computer may each be coupled to the network(s) using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

In some embodiments the backup server computer(s) 150 may implement a cloud-computing backup service for the client computer systems. For example, the backup storage system 100 may be located remotely from the client computer systems and may communicate with them via the Internet to provide cloud-based backup storage services to the client computer systems.

Figure 2:
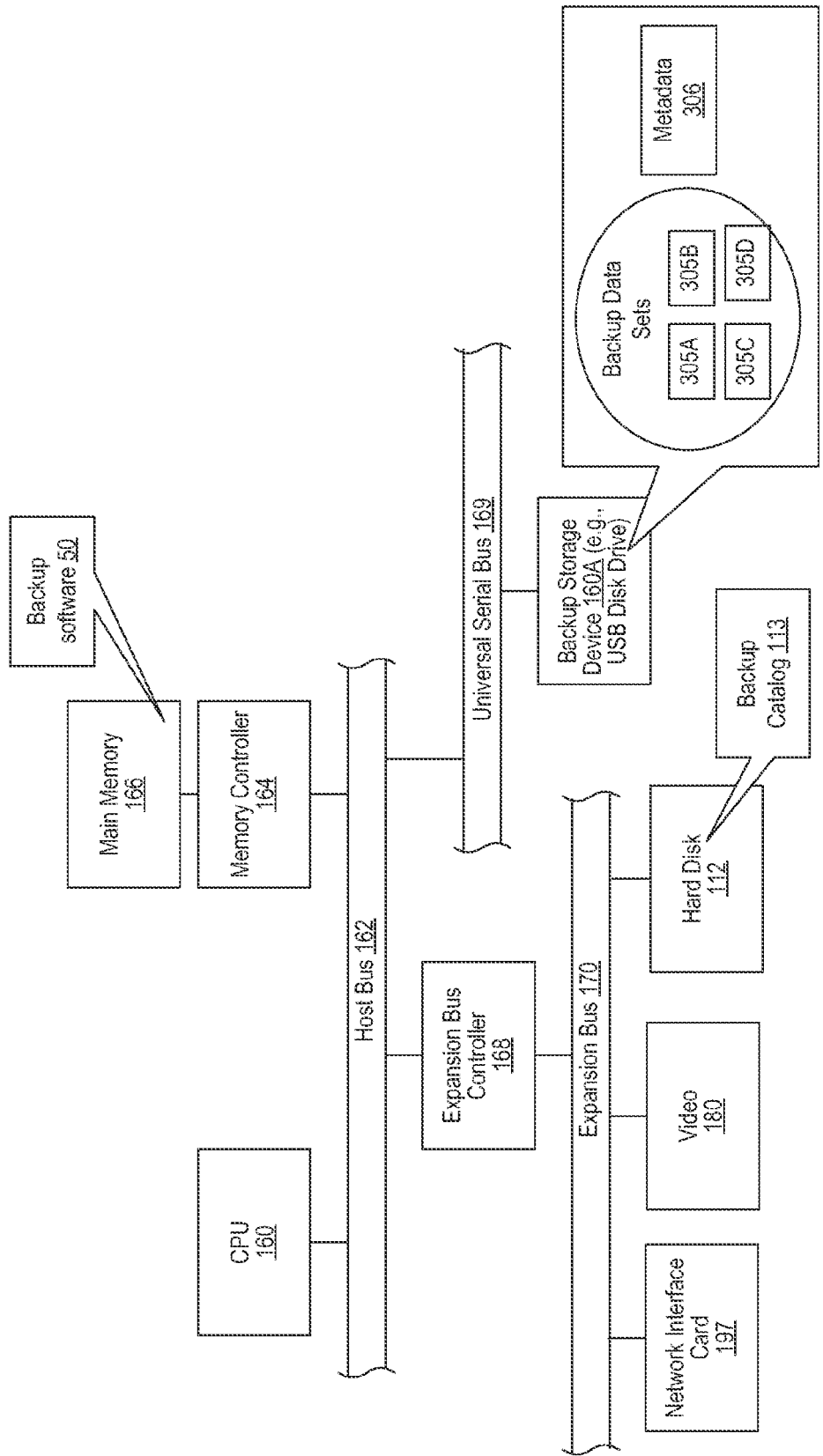
FIG. 2 illustrates an example of a backup server computer included in the backup storage system.

FIG. 2 illustrates an example of the backup server computer 150 according to one embodiment. In various embodiments, the backup software 50 may execute on any kind of computer system or computing device(s), such as one or more personal computer systems (PC), workstations, servers, network appliances, or other type of computing device or combinations of devices. In general, the backup server computer 150 may be any device (or combination of devices) having at least one processor that executes instructions from one or more storage mediums. The backup server computer 150 may have any configuration, architecture, or form factor, and FIG. 2 illustrates a representative PC embodiment. Elements of a computer not necessary to understand the present description have been omitted for simplicity.

The backup server computer 150 may include at least one central processing unit or CPU (processor) 160 which is coupled to a processor or host bus 162. The CPU 160 may be any of various types. For example, in some embodiments, the processor 160 may be compatible with the x86 architecture, while in other embodiments the processor 160 may be compatible with the SPARC™ family of processors. Also, in some embodiments the backup server computer 150 may include multiple processors 160.

The backup server computer 150 may also include memory 166 in which program instructions implementing the backup software 50 are stored. In some embodiments the memory 166 may include one or more forms of random access memory (RAM) such as dynamic RAM (DRAM) or synchronous DRAM (SDRAM). In other embodiments, the memory 166 may include any other type of memory configured to store program instructions. The memory 166 may also store operating system software or other software used to control the operation of the backup server computer 150. The memory controller 164 may be configured to control the memory 166.

The host bus 162 may be coupled to an expansion or input/output bus 170 by means of an expansion bus controller 168 or bus bridge logic. The expansion bus 170 may be the PCI (Peripheral Component Interconnect) expansion bus, although other bus types can be used. Various devices may be coupled to the expansion or input/output bus 170, such as a video display subsystem 180 which sends video signals to a display device, a network interface card 197, etc.

In this example, a USB disk drive is used as a backup storage device 160A, although in other embodiments any of various other kinds of backup storage devices 160 may couple to the backup server computer 150, as discussed above. The USB disk drive may be connected to a Universal Serial Bus 169 of the backup server computer 150 via a USB port provided by the backup server computer 150.

The backup software 50 may create a plurality of backup data sets 305 and store them on the backup storage device(s) 160. For example, FIG. 2 illustrates four backup data sets 305A-D that have been stored on the backup storage device 160A. Each of the backup data sets may be created by the backup software 50 when the backup software 50 performs one of the scheduled backup operations. The backup software 50 may also store metadata 306 on each backup storage device which describes the backup data sets stored on that backup storage device.

The backup software 50 may also store backup catalog information 113 describing the various backup data sets stored on the backup storage devices 160. The catalog information 113 may be stored on a hard disk drive 112 or other storage device of the backup server computer 150. The hard disk drive 112 may be a different storage device than the backup storage devices 160, and may be a storage device to which the backup server computer has continuous access.

Figure 3:
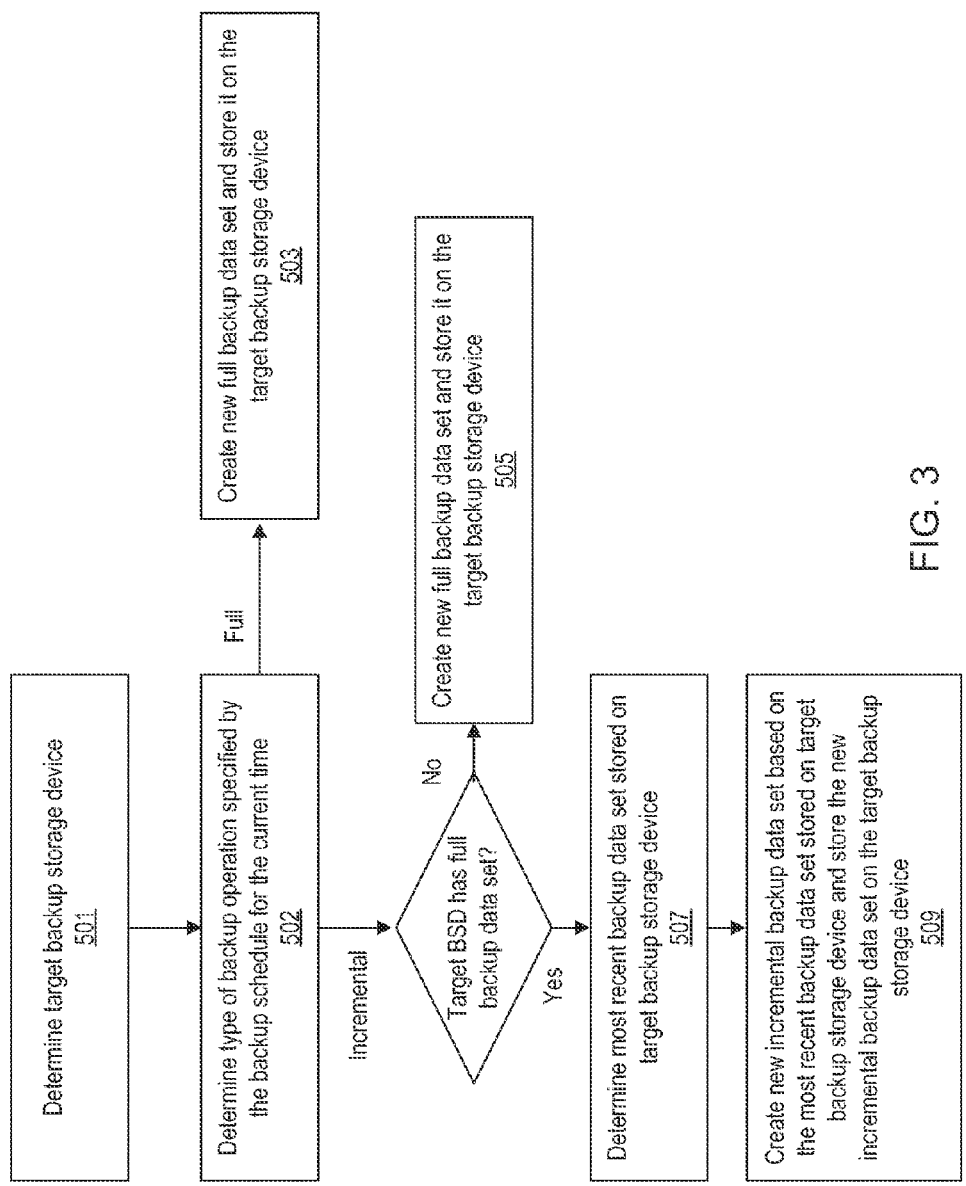
FIG. 3 is a flowchart diagram illustrating one embodiment of a method for performing a backup operation which may be implemented by the backup storage system.

FIG. 3 is a flowchart diagram illustrating one embodiment of a method for performing a backup operation specified by the backup schedule. The method may be implemented by the backup software 50 which executes on the backup server computer 150.

As indicated in block 501, the backup software 50 may determine which of the plurality of backup storage devices 160 is the target backup storage device for the current backup operation. In an embodiment in which a user manually swaps out the backup storage devices between backup operations, this may be done by determining which backup storage device is currently connected to the backup server computer system. Otherwise, if all of the backup storage devices stay connected to the backup server computer system, the backup software 50 may perform a selection algorithm to alternate among them.

In some embodiments the selection algorithm may be a round robin algorithm, or the user may manually swap out the backup storage devices in a round-robin fashion. For example, the backup software may assign a circular order to the backup storage devices, and each time a new backup operation is performed, the next backup storage device in the order may be selected as the backup storage device. In other embodiments, other kinds of alternation techniques or algorithms may be used. As one example, the same backup storage device could be used for two backup operations in a row, and then the next two backup operations could be targeted to a different backup storage device, etc. As another example, one backup storage device could be used for backup operations every Friday, and another backup storage device could be used for backup operations every other day. In general, any kind of alternation algorithm or schedule can be used. In some embodiments the user may provide user input to specify the desired alternation schedule, or the user can manually control the alternation by swapping out the backup storage devices as desired.

As indicated in block 502, the backup software may determine what type of backup operation the current backup operation is, e.g., may determine what type of backup operation is specified by the backup schedule for the current time. As indicated in block 503, if the current backup operation is a full backup operation then the backup software may create a new full backup data set and store it on the target backup storage device.

Otherwise, if the current backup operation is an incremental backup operation then the backup software may determine whether the target backup storage device already has a full backup data set stored on it. If not then the backup software may create a new full backup data set and store it on the target backup storage device (block 505). Thus, in this case a full backup operation may be performed even though the backup schedule specifies an incremental backup operation to be performed at this time.

Otherwise, if the target backup storage device already has a full backup data set stored on it then the backup software may determine the most recent backup data set stored on the target backup storage device (block 507). In some embodiments, each time a backup data set is stored on a backup storage device, the backup software may add an entry to the backup catalog 113 specifying the time when the backup data set was created and the ID of the backup storage devices on which it was stored. Thus, in some embodiments the backup software may use the ID of the target backup storage device as an index value to the backup catalog 113 to lookup the most recent backup data set that was stored on the target backup storage device. In other embodiments the backup software 50 may examine the metadata 306 which is stored on the target backup storage device and which describes the backup data sets stored on the target backup storage device in order to find the most recent one.

The backup software may create a new incremental backup data set based on the most recent backup data set stored on target backup storage device, and store the new incremental backup data set on the target backup storage device (block 509). The new incremental backup data set may include data that has changed between the time when the most recent backup data set stored on the target backup storage device was created and the current time when the current backup operation is being performed.

When backing up files, the incremental backup operations performed by the backup software may be either file-based incremental backup operations or block-based incremental backup operations. The files maintained by a file system are generally composed of lower level data units referred to as blocks. A file-based incremental backup operation is performed at the file level of abstraction. For example, the backup software identify which files have changed since the time when the most recent backup data set stored on target backup storage device was created, and copy complete copies of these files into the new incremental backup data set on the target backup storage device. All of the blocks of the changed files may be copied into the new incremental backup data set even if only a few of them have changed.

A block-based incremental backup operation is performed at the block level of abstraction. For example, the backup software identify which blocks have changed since the time when the most recent backup data set stored on target backup storage device was created, and copy only the changed blocks into the new incremental backup data set on the target backup storage device. Suppose for example that for a given file 1000 blocks in size, 15 of the blocks have changed since the time when the most recent backup data set stored on target backup storage device was created, and the other blocks of the file have not changed. In this example, only the 15 changed blocks of the file may be copied into the new incremental backup data set.

For block-based incremental backup operations, the changed blocks may be determined using any of various kinds of change tracking or snapshot techniques. For example, in some embodiments the system may maintain copy-on-write snapshots or other types of snapshots for the data objects, and the changed blocks may be determined from the snapshots. In other embodiments the file system may maintain a change log which the backup software can analyze to determine which blocks have changed. If insufficient information is available to determine the specific blocks that have changed for a given data object then a full backup of that data object may be performed.

In some embodiments the backup storage system may use an agent-based architecture where different software agents are responsible for tracking changes and/or backing up different kinds of data objects. (The term software agent may refer to any software component, module, or program.) For example, one agent may be responsible for backing up one kind of database, another agent may be responsible for backing up another kind of database, and another agent may be responsible for backing up virtual machines, etc. When performing an incremental backup operation to backup a particular data object to a given backup storage device, the backup storage system may request the agent corresponding to the data object to provide information specifying which blocks of the data object have changed since the time when the most recent backup data set stored on the same backup storage device was created. In some cases the agent may not be able to provide this information. For example, the agent may not maintain a snapshot or change log that goes back in time far enough to the time when the most recent backup data set stored on the same backup storage device was created. If the agent returns an indication that the agent cannot provide information specifying the changed blocks of the data object then the backup storage system may backup a complete copy of the data object.

For file-based incremental backup operations, the changed files may be determined by the modification times of the files, e.g., as maintained by the file system or as specified in a change log. If a change log is used and it does not go back far enough in time to determine which files have changed since the time when the most recent backup data set stored on the same backup storage device was created then the backup storage system may perform a full backup operation, e.g., to backup all the files instead of only the changed files.

FIG. 4 illustrates an example of a backup schedule in which full backup operations are scheduled to be performed every Friday at 11:00 pm, and incremental backup operations are scheduled to be performed every Monday-Thursday at 11:00 pm. In this example the backup storage system uses two backup storage devices. Assume that both of them are initially empty and the schedule begins running on a Friday (Day 1). As shown, on Day 1 the backup software may create a full backup data set and store it on a first one of the backup storage devices. Although Day 2 is a Monday and an incremental backup operation is scheduled for this day, the backup software may instead create a full backup data set and store it the second backup storage device on this day, since the second backup storage device does not yet have a full backup data set stored on it.

On Day 3 the backup software may create an incremental backup data set which includes the data that changed between 11 pm on Day 1 and 11 pm on Day 3, and store it on the first backup storage device. On Day 4 the backup software may create an incremental backup data set which includes the data that changed between 11 pm on Day 2 and 11 pm on Day 4, and store it on the second backup storage device. The schedule may continue in this manner such that a complete recovery chain of data is maintained on both backup storage devices. If one of them fails then at most one day of incremental backup data could be lost, and all of the backup data sets stored on the other backup storage device can still be recovered.

Figure 5:
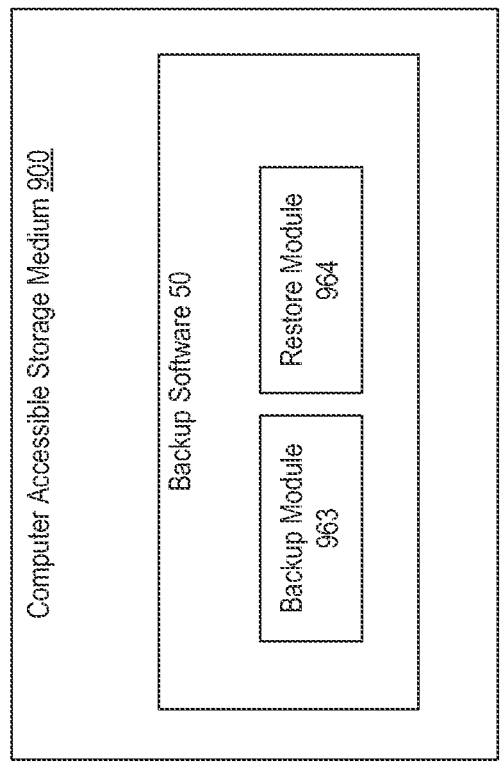
FIG. 5 is a block diagram of a computer accessible storage medium on which backup software is stored.

Turning now to FIG. 5, a block diagram of a computer accessible storage medium 900 is shown. The computer accessible storage medium 900 may store program instructions executable by one or more processors to implement various functions described above, such as program instructions associated with the backup software 50. Generally, the backup software 50 may include any set of instructions which, when executed, implement a portion or all of the functions described herein. For example, the backup software 50 may a backup module 963 configured to perform backup operations as described above. The backup software 50 may also include a restore module 964 configured to restore (e.g., recover) the backup data sets stored on the backup storage devices to the client computer systems 110 (or to other desired target recovery locations).

Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A non-transitory computer-accessible storage medium storing program instructions executable by one or more processors to:
   create a first backup of a data set to form a first backup data set on a first storage device at a first point in time;
   create a second backup of the data set to form a second backup data set on a second storage device at a second point in time after the first point in time, wherein the second storage device is different from the first storage device;
   in response to a request to create an incremental backup of the data set to form an incremental backup data set on the first storage device at a third point in time after the second point in time:
      determine the first backup data set is a most recent backup data set on the first storage device although the second backup data set on the second storage device is a more recent backup data set than the first backup data set; and
      create the incremental backup data set comprising changes to the first backup dataset since the first point in time and including changes to the first backup dataset occurring after the first point in time and prior to the second point in time;
   wherein to determine the most recent backup data set on the first storage device, the program instructions are executable by the one or more processors to:
      determine an identifier (ID) of the first storage device by accessing metadata on the first storage device, rather than any entries of a backup catalog;
      lookup an entry in the backup catalog using the ID; and
      read from the entry a time that a most recent backup data set was created on the first storage device.

2. The non-transitory computer-accessible storage medium of claim 1, wherein a plurality of backup operations are alternated at different times across the first storage device and the second storage device in a round-robin fashion, and wherein a complete recovery chain is maintained on each of the first storage device and the second storage device such that a full restore operation may be performed using only one of either the first storage device or the second storage device.

3. The non-transitory computer-accessible storage medium of claim 1, wherein the program instructions are executable by the one or more processors to add an entry to a backup catalog specifying a point in time when a given backup data set is created and an identifier (ID) of a storage device on which the given backup data set is stored.

4. The non-transitory computer-accessible storage medium of claim 1, wherein a backup schedule specifies that an incremental backup operation should be performed at a particular time, wherein the program instructions are executable by the one or more processors to:
   at the particular time, determine that a particular storage device of the first storage device and the second storage device should be used for a new backup operation; and
   perform the new backup operation at the particular time as a full backup operation instead of the specified incremental backup operation in response to determining that a full backup operation has not yet been performed on the particular storage device.

5. The non-transitory computer-accessible storage medium of claim 1, wherein the first backup data set and the incremental backup data set are separately stored and concurrently maintained on the first storage device, and wherein the program instructions are executable to:
 use the first backup data set to perform a recovery to the first point in time; and
 use the incremental backup data set to perform a recovery to the third point in time.

6. The non-transitory computer-accessible storage medium of claim 1, wherein to determine the most recent backup data set on the first storage device, the program instructions are executable by the one or more processors to read metadata on the first storage device, wherein the metadata describes one or more backup data sets stored on the first storage device.

7. The non-transitory computer-accessible storage medium of claim 1,
 wherein a plurality of backup operations includes a first full backup operation performed at a first time to the first storage device and a second full backup operation performed at a second time to the second storage device;
 wherein the plurality of backup operations further includes a first incremental backup operation performed at a third time to the first storage device, wherein in performing the first incremental backup operation, the program instructions are executable by the one or more processors to determine a first set of data from one or more data objects that has changed between the first time and the third time, and backup the first set of data to the first storage device.

8. The non-transitory computer-accessible storage medium of claim 7,
 wherein the plurality of backup operations further includes an incremental backup operation performed at a fourth time to the second storage device, wherein in performing the incremental backup operation at the fourth time, the program instructions are executable by the one or more processors to determine a second set of data from the one or more data objects that has changed between the second time and the fourth time, and backup the second set of data to the second storage device.

9. The non-transitory computer-accessible storage medium of claim 8,
 wherein the plurality of backup operations further includes a third incremental backup operation performed at a fifth time to the first storage device, wherein in performing the third incremental backup operation, the program instructions are executable by the one or more processors to determine a third set of data from the one or more data objects that has changed between the third time and the fifth time, and backup the third set of data to the first storage device.

10. The non-transitory computer-accessible storage medium of claim 1, wherein one or more data objects includes a particular data object of a particular type, wherein a plurality of backup operations includes an incremental backup operation performed at a particular time, wherein in performing the incremental backup operation, the program instructions are further executable by the one or more processors to:
 determine a software agent corresponding to the particular type of the particular data object; and
 request the software agent to provide information specifying a subset of data blocks of the particular data object to store in a new backup data set for the incremental backup operation.

11. The non-transitory computer-accessible storage medium of claim 10, wherein the program instructions are further executable by the one or more processors to:
 receive an indication from the software agent that the software agent cannot provide the requested information; and
 in response to said receiving the indication, store a complete copy of the particular data object in the new backup data set for the incremental backup operation.

12. A method comprising:
 creating a first backup of a data set to form a first backup data set on a first storage device at a first point in time;
 creating a second backup of the data set to form a second backup data set on a second storage device at a second point in time after the first point in time, wherein the second storage device is different from the first storage device;
 in response to a request to create an incremental backup of the data set to form an incremental backup data set on the first storage device at a third point in time after the second point in time:
  determining the first backup data set is a most recent backup data set on the first storage device although the second backup data set on the second storage device is a more recent backup data set than the first backup data set; and
  creating the incremental backup data set comprising changes to the first backup dataset since the first point in time and including changes to the first backup dataset occurring after the first point in time and prior to the second point in time;
 wherein in response to determining it is time to perform a backup operation based on a backup schedule:
  accessing, prior to performing the backup operation, metadata on a storage device on which a backup data set is to be stored;
  using information in the accessed metadata to:
   identify the storage device;
   determine a point in time of a most recent backup data set on the storage device;
   determine whether a full backup data set is stored on the storage device; and
   performing the backup operation based on the information in the accessed metadata.

13. The method of claim 12, wherein to determine the most recent backup data set on the first storage device, the method further comprises reading metadata on the first storage device, wherein the metadata describes one or more backup data sets stored on the first storage device.

14. The method of claim 12, further comprising adding an entry to a backup catalog specifying a point in time when a given backup data set is created and an identifier (ID) of a storage device on which the given backup data set is stored.

15. The method of claim 12, wherein a backup schedule specifies that an incremental backup operation should be performed at a first time, further comprising:
 at the first time, determining that a particular storage device of the first storage device and the second storage device should be used for a new backup operation; and
 performing the new backup operation at the first time as a full backup operation instead of the specified incremental backup operation in response to determining that a full backup operation has not yet been performed on the particular storage device.

16. The method of claim 12, wherein the first backup data set and the incremental backup data set are separately stored and concurrently maintained on the first storage device, and wherein the method further comprises:
   using the first backup data set to perform a recovery to the first point in time; and
   using the incremental backup data set to perform a recovery to the third point in time.

17. The method of claim 12, further comprising alternating a plurality of backup operations at different times across the first storage device and the second storage device in a round-robin fashion.

18. A system comprising:
   a plurality of storage devices;
   one or more processors; and
   memory storing program instructions, wherein the program instructions are executable by the one or more processors to:
      create a first backup of a data set to form a first backup data set on a first storage device at a first point in time;
      create a second backup of the data set to form a second backup data set on a second storage device at a second point in time after the first point in time, wherein the second storage device is different from the first storage device;
      in response to a request to create an incremental backup of the data set to form an incremental backup data set on the first storage device at a third point in time after the second point in time:
         determine the first backup data set is a most recent backup data set on the first storage device although the second backup data set on the second storage device is a more recent backup data set than the first backup data set; and
         create the incremental backup data set comprising changes to the first backup dataset since the first point in time and including changes to the first backup dataset occurring after the first point in time and prior to the second point in time;
      wherein to determine the most recent backup data set on the first storage device, the program instructions are executable by the one or more processors to:
      determine an identifier (ID) of the first storage device by accessing metadata on the first storage device, rather than any entries of a backup catalog;
      lookup an entry in the backup catalog using the ID; and
      read from the entry a time that a most recent backup data set was created on the first storage device.

* * * * *